United States Patent [19]
Rabowsky et al.

[11] Patent Number: 5,635,929
[45] Date of Patent: Jun. 3, 1997

[54] LOW BIT RATE VIDEO ENCODER AND DECODER

[75] Inventors: Irving Rabowsky, Woodland Hills; Donald C. Mead, Carlsbad, both of Calif.

[73] Assignee: Hughes Aircraft Company, Los Angeles, Calif.

[21] Appl. No.: 387,992

[22] Filed: Feb. 13, 1995

[51] Int. Cl.$^6$ .................................................. H03M 7/00
[52] U.S. Cl. ............................................................. 341/50
[58] Field of Search ........................ 341/50, 67; 348/405, 348/408, 419

[56] References Cited

U.S. PATENT DOCUMENTS 4,214,263  7/1980  Kaiser ........................ 358/22

*Primary Examiner*—Brian K. Young
*Attorney, Agent, or Firm*—Phyllis Y. Price; Terje Gudmestad; Wanda K. Denson-Low

[57] ABSTRACT

Methods and systems for encoding a video signal into a bit stream, and for reconstructing the video signal from the bit stream are disclosed. In an embodiment of an encoder, an object encoder (22) assigns a symbolic code to an object contained in at least one video frame, wherein the symbolic code identifies a corresponding generic object from a set of generic objects. A difference processor (32), coupled to the object encoder (22), computes a difference signal in dependence upon a difference between the object and the corresponding generic object. A multiplexer (30) provides the bit stream based upon the difference signal and the symbolic code. In an embodiment of a decoder, a demultiplexer (82) extracts a symbolic code and a difference signal from the encoded video signal. The symbolic code identifies a corresponding generic object from a set of generic objects, and the difference signal represents a difference between an object and the corresponding generic object. An object generator (84) forms the video signal by generating the corresponding generic object identified by the symbolic code, and modifying the corresponding one of the generic objects in dependence upon the difference signal.

24 Claims, 4 Drawing Sheets

LOW BIT RATE VIDEO ENCODER AND DECODER

TECHNICAL FIELD

The present invention relates generally to methods and systems for video signal processing, and more particularly, to methods and systems for encoding and decoding video signals.

BACKGROUND OF THE INVENTION

Video compression systems are employed to reduce the number of bits needed to transmit and store a digital video signal. As a result, a lower bandwidth communication channel can be employed to transmit a compressed video signal in comparison to an uncompressed video signal. Similarly, a reduced capacity of a storage device, which can comprise a memory or a magnetic storage medium, is required for storing the compressed video signal. A general video compression system includes an encoder, which converts the video signal into a compressed signal, and a decoder, which reconstructs the video signal based upon the compressed signal.

In the design of a video compression system, an objective is to reduce the number of bits needed to represent the video signal while preserving its visual content. Current methods and systems for video compression have achieved a reasonable quality of content preservation at a transmission bit rate of 56 kilobits per second. These methods and systems are based upon directly compressing a waveform representation of the video signal.

SUMMARY OF THE INVENTION

The need exists for a video compression system which significantly reduces the number of bits needed to transmit and store a video signal, and which simultaneously preserves the visual content of the video signal.

It is thus an object of the present invention to significantly reduce the bit rate needed to transmit a video signal.

Another object of the present invention is to provide a video encoder and a corresponding video decoder which allows a selectable personalization of an encoded video signal.

A further object of the present invention is to provide a symbolic encoding and decoding of a video signal.

In carrying out the above objects, the present invention provides a system for encoding a video signal into a bit stream, wherein the video signal is representative of a sequence of at least one video image frame. An object encoder assigns a symbolic code to an object contained in the at least one video frame, wherein the symbolic code identifies a corresponding generic object from a set of generic objects. A difference processor, coupled to the object encoder, computes a difference signal in dependence upon a difference between the object and the corresponding generic object. A multiplexer provides the bit stream based upon the difference signal and the symbolic code.

Further in carrying out the above objects, the present invention provides a system for encoding a video signal into a bit stream, wherein the video signal is representative of a sequence of at least one video image frame. An image segmenter segments the at least one video image frame into a plurality of objects. A feature extractor, coupled to the image segmenter, forms at least one feature quantity for each of the objects. A classifier, coupled to the feature extractor and to a first storage device containing a set of generic objects, recognizes at least one of the objects as a corresponding generic object based upon the at least one feature quantity. A difference processor, coupled to the classifier, computes a difference signal in dependence upon a difference between the at least one of the objects and the corresponding generic object. The difference processor includes a second storage device in which a representation of the difference signal is stored. A motion estimator provides a motion compensation signal based upon the motion of at least one of the objects from a first frame to a second frame. A multiplexer provides the bit stream based upon the symbolic code, the difference signal, and the motion compensation signal.

Still further in carrying out the above objects, the present invention provides methods of encoding a video signal into a bit stream in accordance with steps performed by the above-described systems.

Yet still further in carrying out the above objects, the present invention provides a system for reconstructing a video image from a bit stream representative of an encoded video signal. A demultiplexer extracts a symbolic code and a difference signal from the encoded video signal. The symbolic code identifies a corresponding generic object from a set of generic objects, and the difference signal represents a difference between an object and the corresponding generic object. An object generator forms the video signal by generating the corresponding generic object identified by the symbolic code, and modifying the corresponding one of the generic objects in dependence upon the difference signal.

Still further in carrying out the above objects, the present invention provides a method of reconstructing a video image in accordance with steps performed by the above-described system.

These and other features, aspects, and advantages of the present invention will become better understood with regard to the following description, appended claims, and accompanying drawings.

BEST MODES FOR CARRYING OUT THE INVENTION

Embodiments of the present invention overcome the disadvantages of previous systems by recognizing objects within a video image, and then classifying the objects with symbolic identifiers. Differences between the recognized object and the closest tabulated symbolic representation are collected in a personalization data file. Coding of the symbolic representation and the personalization file then takes place and the data is multiplexed into a bit stream for either transmission or storage.

Figure 1:
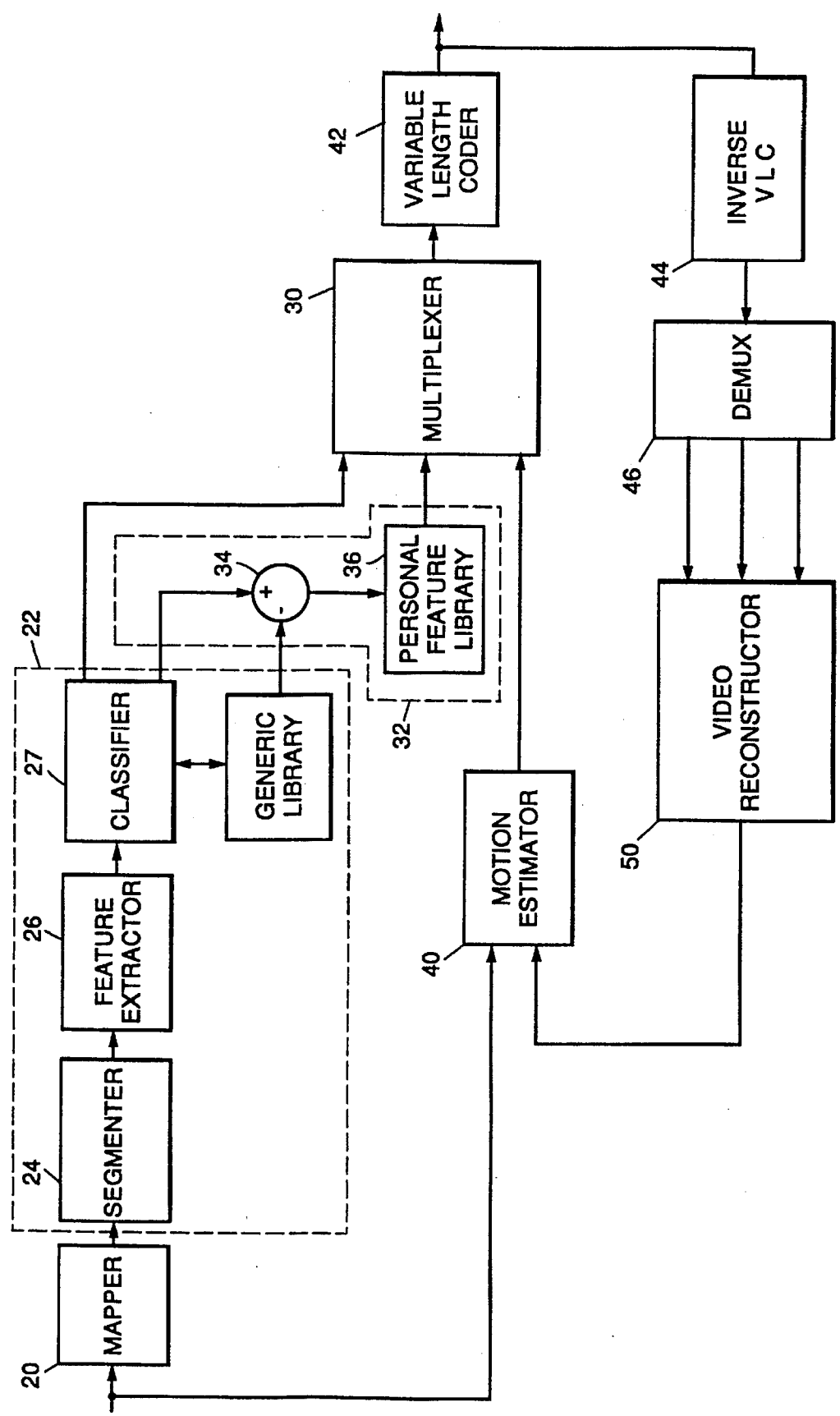
FIG. 1 is a block diagram of an embodiment of an encoder in ac dance with the present invention.

Art embodiment of a video encoder in accordance with the present invention is illustrated by the block diagram in FIG. 1. The video encoder provides a system for encoding a video signal into a bit stream for transmission to a corresponding decoder. A video signal, representative of one or more frames of video footage, is applied as an input to a mapper 20. In a preferred embodiment, the video signal is in the form of an incoming digital bit stream representative of an uncompressed digital video signal, although alternative embodiments are not limited thereto.

The mapper 20 maps pixels represented by the digital bit stream into an intermediate representation conducive to effective coding. More specifically, the mapper 20 performs a transform coding operation in forming the intermediate representation. The transform coding operation produces an output signal representative of a plurality of coefficients having reduced statistical correlation. One having ordinary skill in the art will recognize that the mapper 20 can employ standard transforms such as Karhunen-Loeve, discrete cosine, Fourier, and Hadamard, to name a few, as well as non-standard transforms.

The output of the mapper 20 is applied to an object encoder 22. The object encoder 22 extracts at least one object in the video frames, and assigns a symbolic code to each object based upon recognition of the object from a set of generic objects. The object encoder 22 includes an image segmenter 24 which subdivides an image into at least one object. For the purpose of this application, an object of an image can be representative of a constituent part of the image, a region of the image, or another entity of interest in the image. Examples of objects which are extracted by the image segmenter 24 include a human face, an hand, an arm, and a background. Various types of segmentation procedures can be employed by the image segmenter 24, as one with ordinary skill in the art of image processing will recognize.

The object encoder 22 further includes a feature extractor 26, coupled to the image segmenter 24. The feature extractor 26 describes the at least one object based upon at least one feature quantity computed therefrom. In general, the feature extractor 26 reduces the representation of an object to a smaller number of components having sufficient information for discrimination therebetween. Various procedures for feature extraction can be employed by the feature extractor 26, as one with ordinary skill in the art of image processing will recognize.

Based upon the at least one feature quantity, each extracted object is compared by a classifier 27 to a set of generic objects, located in a generic library 28, for object recognition. The generic library 28, which is embodied by an electronic storage device, contains a corresponding symbolic code for each of the generic objects. As an example, for an extracted object comprising a human head, the feature extractor 26 can extract features based upon shape and color for use by the classifier 27 in comparing to known human heads in the generic library 28. The classifier 27 then produces the symbolic code corresponding to the closest recognized object in the generic library 28 based upon the at least one feature quantity. In the above-described example, the symbolic code for the closest recognized human head would be outputted by the object encoder 22. In general, the object encoder 22 provides the symbolic code for each recognized object to a multiplexer 30.

It is possible that an extracted object may not be recognized by any of the generic objects in the generic library 28. In this case, the classifier 27 can add any unrecognized objects to the generic library 28 to be used as references for future similar objects. In a preferred embodiment, the classifier 27 includes an expert system to perform the object recognition. The unrecognized objects are provided to the multiplexer 30 for transmission to a corresponding decoder.

Differences between a recognized object and a corresponding closest matching generic object are collected by a difference processor 32. More specifically, the difference processor 32, which is coupled to the object encoder 22, computes a difference signal in dependence upon the recognized object provided by the classifier 27 and the closest matching generic object within the generic library 26. This difference signal is computed by a differencing element 34. A representation of the difference signal is stored within a personal feature library 36. In a preferred embodiment, the personal feature library 36 is formed by an electronic storage device, and the difference signal is represented by a personality file stored therein. The personality file may be formed utilizing a psycho visual model. The output of the difference processor 32 is provided to the multiplexer 30.

The video signal is further applied to a motion estimator 40. The motion estimator 40 performs a frame-to-frame comparison of the video signal to determine whether any objects are in motion. In a similar manner, the motion estimator 40 determines whether an originating camera which produces the video signal is panning or scanning. In this case, the entire field of view, including stationary objects, would be in motion. Based upon these determinations, the motion estimator 40 produces a motion compensation signal representative of both object motion information and camera pan and scan information. For example, if a person is waving his/her arm, the arm would be an object for which the motion estimator would compute motion information. In a preferred embodiment, the motion compensation signal is represented by a motion compensation file. Various procedures for motion estimation can be employed by the motion estimator 26, as one with ordinary skill in the art of image processing will recognize. The motion compensation signal produced by the motion estimator 40 is provided to the multiplexer 30.

The multiplexer 30 multiplexes the symbolic code provided by the object encoder 22, the difference signal provided by the difference processor 32, and the motion compensation signal provided by the motion estimator 40, to produce a serial bit stream representative thereof. As a result, the bit stream contains information related to the generic objects used to represent objects in the video image, the differences between the actual extracted objects and the generic objects, and motion of the objects. Further, the bit stream contains unrecognized objects which were added to the generic library 28. In a preferred embodiment, the multiplexer 30 formats the symbolic code, the personality file, the motion compensation file, and appropriate synchronization information to form the bit stream. The bit stream is applied to a variable length coder 42, or a similar entropy coder, in order to further reduce the number of bits needed to represent the video signal. The variable length coded bit stream is outputted for transmission to a corresponding decoder.

The variable length coded bit stream is applied to a combination of an inverse variable length coder 44 and a demultiplexer 46. As a result, the demultiplexer 46 recovers the symbolic code, the personality file, and the motion compensation file for application to a video reconstructor 50. The video reconstructor 50 reconstructs the video signal in accordance with procedure used by the corresponding decoder. The reconstructed video signal is applied to the motion estimator 40 to allow the motion compensation signal to be based thereupon.

Figure 2:
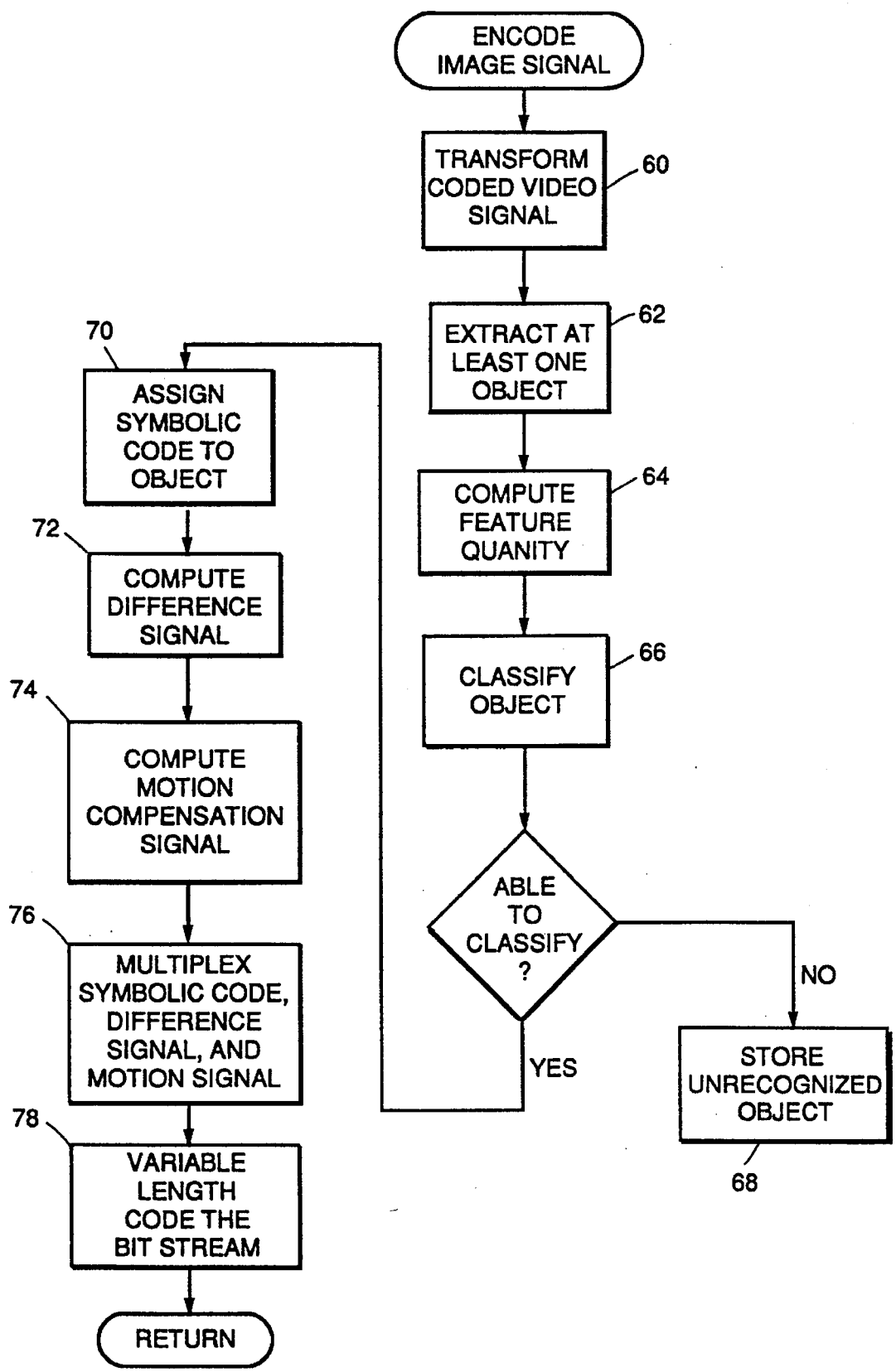
FIG. 2 is a flow chart of a method of encoding a video signal.

In accordance with the present invention, an embodiment of a method of encoding a video signal into a bit stream is illustrated by the flow chart in FIG. 2. A step of transform coding of the video signal is performed in block 60. Based upon the transform coded video signal, block 62 performs a step of extracting at least one object from the video image. The step of extracting can include a step of segmenting the video image into one or more objects. In block 64, a step of computing one or more feature quantities for the at least one object is performed. Block 66 performs a step of classifying the at least one extracted object from a set of generic objects. This step can include a step of comparing the one or more feature quantities to stored features of the generic objects. If the step of classifying the object is unsuccessful, then the resulting unrecognized object is stored in the set of generic objects by block 68.

For each object for which the step of classifying is successful, block 70 performs a step of assigning a symbolic code representative of the closest one of the generic objects. A step of computing a difference signal in dependence upon a difference between the recognized object and the closest one of the generic objects is performed in block 72. Block 74 performs a step of computing a motion signal based upon the frame-to-frame motion of the objects. In block 76, a step of multiplexing the symbolic code, the difference signal, and the motion signal to form the bit stream is performed. A step of variable length coding the bit stream is performed in block 78.

Figure 3:
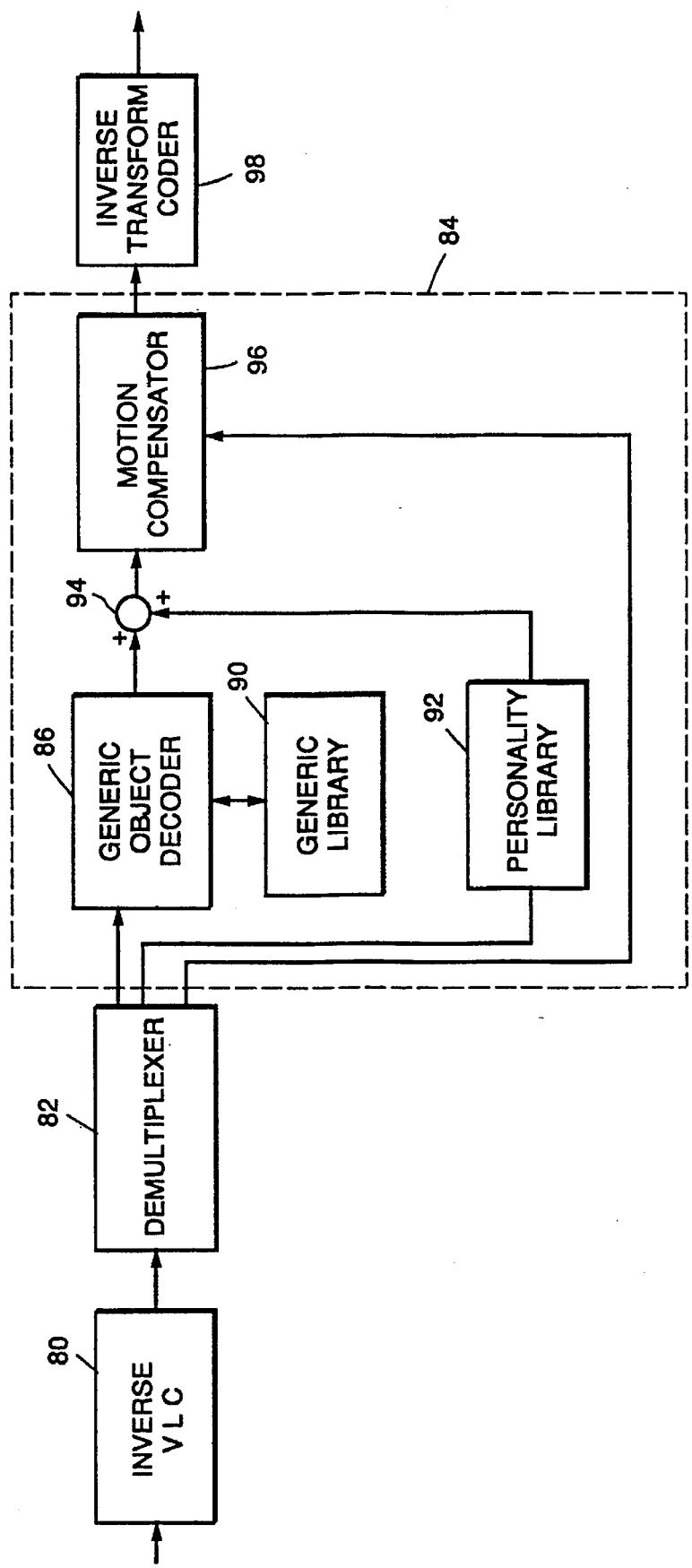
FIG. 3 is a block diagram of an embodiment of a decoder in accordance with the present invention.

An embodiment of a decoder in accordance with the present invention is illustrated by the block diagram in FIG. 3. The decoder provides a system for reconstructing a video image from a bit stream representative of an encoded video signal received from a corresponding encoder. The bit stream enters an inverse variable length coder 80, or a like inverse entropy coder, which decompresses the bit stream. The decompressed bit stream is applied to a demultiplexer 82 which extracts a symbolic code, a difference signal, and a motion compensation signal represented therein. Further, a new object which was unrecognized in the encoder may be contained within the bit stream. In a preferred embodiment, the demultiplexer 82 includes a synchronizer which generates an internal clock signal in order to lock onto the bit stream.

The extracted symbolic code, difference signal, and motion compensation signal are applied to an object generator 84. The object generator 84 includes a generic object decoder 86 and a generic object library 90 coupled thereto. The generic object library 90, which contains a set of generic objects and corresponding symbolic identification codes therefor, is preferably embodied by an electronic storage device. The generic object decoder 86 acts to generate a corresponding generic object in the generic object library 90, wherein the corresponding generic object is identified by the extracted symbolic code. Here, for example, a generic human head object may be generated in response to a corresponding symbolic code. The generic object library 90 is updated upon receiving, within the bit stream, new objects which were unrecognized in the encoder. Hence, new objects added to the generic library 28 are also added to the generic object library 90 on a timely basis.

The extracted difference signal is applied to a personality library 92 within the object decoder 84. The personality library 92 stores the extracted difference signal for modification of the generated generic object. In a preferred embodiment, the personality library 92 comprises an electronic storage device. A summing element 94 representatively indicates the generated generic object being modified based upon the difference signal. Using the above-described example, the generic human head object can be modified by the difference signal at this point to more closely resemble the human head in the original video image.

The extracted motion compensation signal is applied to a motion compensator 96. The motion compensator 96 modifies a location of the generated object in dependence upon the motion compensation signal. In our example, the motion compensator 96 can be employed if the location of the human head changes from a first image frame to a second image frame.

The output of the object generator 84 is applied to an inverse transform coder 98. The inverse transform coder 98 performs an inverse of the coding operation performed by the mapper 20 in an embodiment of the encoder. The output of the inverse transform coder 98 provides a reconstructed video signal. In a preferred embodiment, the reconstructed video signal is in the form of a digital video bit stream.

Figure 4:
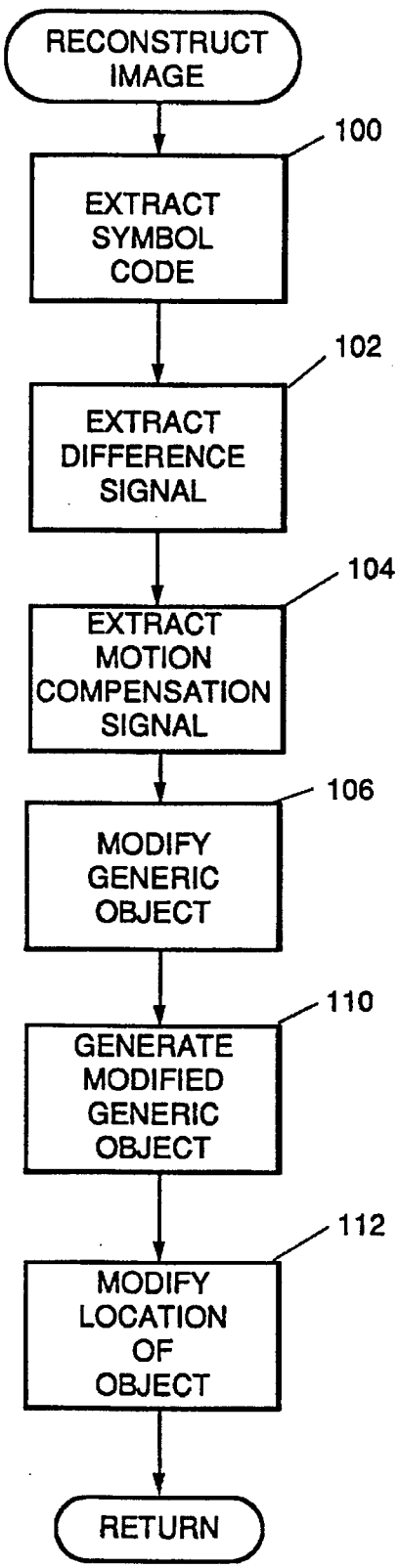
FIG. 4 a flow chart of a method of decoding an encoded video signal.

In accordance with the present invention, an embodiment of a method of reconstructing a video image from an encoded video signal is illustrated by the flow chart in FIG. 4. Block 100 performs a step of extracting a symbolic code from the encoded video signal, wherein the symbolic code identifies a corresponding generic object from a predetermined set of generic objects. In block 102, a step of extracting a difference signal from the encoded video signal is performed. The difference signal is representative of a difference between an object and the corresponding generic object. A step of extracting a motion compensation signal from the encoded video signal is performed in block 104. Block 106 performs a step of modifying the corresponding generic object identified by the symbolic code in dependence upon the difference signal. Block 110 performs a step of generating the modified, corresponding generic object to produce the video image. In block 112, a step of modifying a location of the corresponding generic object in dependence upon the motion compensation signal is performed.

The above-described embodiments of the present invention have many advantages. The encoding of a visual object using a combination of symbolic representation data, a personality file, and motion compensation data results in a significant reduction in the bandwidth required for transmission. Depending on the specific implementation, a 10 to 1 improvement in the video compression ratio can be realized. For example, a video conference which previously required 384 kbps would only require 38.4 kbps.

Another advantage of the present invention is the selectable personalization of the reconstructed video images which results from employing a personality library. Embodiments can include a default option which produces images containing purely generic objects in order to attain the lowest bit rate for operation. Similarly, a higher quality of image reconstruction can be produced in return for a higher bit rate for operation. As a result, the use of the personality library lends itself to adaptability. By determining the capacity of the decoder and a communication link which couples the encoder to the decoder, the encoder can adapt to this capacity.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A system for encoding a video signal into a bit stream, the video signal representative of a sequence of at least one video image frame, the system comprising:

an object encoder which assigns a symbolic code to an object contained in the at least one video frame, wherein the symbolic code identifies a corresponding generic object from a set of generic objects;

a difference processor, coupled to the object encoder, which computes a difference signal in dependence upon a difference between the object and the corresponding generic object; and a multiplexer which provides the bit stream based upon the difference signal and the symbolic code.

2. The system of claim 1 wherein the object encoder includes a first storage device which contains the set of generic objects.

3. The system of claim 2 wherein the object encoder stores an unrecognized object in the first storage device.

4. The system of claim 1 wherein the difference processor includes a second storage device in which a representation of the difference signal is stored.

5. The system of claim 1 wherein the object encoder includes an image segmenter which segments the at least one video image frame into at least one object.

6. The system of claim 1 wherein the object encoder includes a feature extractor which forms at least one feature quantity for the object.

7. The system of claim 6 wherein the difference signal is based upon a difference between the at least one feature for the object and at least one feature from the corresponding generic object.

8. The system of claim 6 wherein the object encoder includes a classifier, coupled to the feature extractor, which determines the corresponding generic object based upon the at least one feature quantity.

9. The system of claim 1 further comprising a mapper which forms a transformed signal in dependence upon the video signal, and provides the transformed signal to the object encoder.

10. The system of claim 1 further comprising a variable length coder, coupled to the multiplexer, which provides a variable length coding of the bit stream.

11. The system of claim 1 further comprising a motion estimator which performs a comparison of a first video frame to a second video frame, and provides a representation of the comparison to the multiplexer.

12. The system of claim 11 wherein the motion detector provides a motion compensation signal to the multiplexer based upon the motion of the object from the first frame to the second frame.

13. A system for encoding a video signal into a bit stream, the video signal representative of a sequence of at least one video image frame, the system comprising:

an image segmenter which segments the at least one video image frame into a plurality of objects;

a feature extractor, coupled to the image segmenter, which forms at least one feature quantity for each of the objects;

a first storage device which contains a set of generic objects;

a classifier, coupled to the feature extractor and to the first storage device, which recognizes at least one of the objects as a corresponding generic object based upon the at least one feature quantity;

a difference processor, coupled to the classifier, which computes a difference signal in dependence upon a difference between the at least one of the objects and the corresponding generic object, the difference processor including a second storage device in which a representation of the difference signal is stored;

a motion estimator which provides a motion compensation signal based upon the motion of at least one of the objects from a first frame to a second frame; and a multiplexer which provides the bit stream based upon the symbolic code, the difference signal, and the motion compensation signal.

14. A method of encoding a video signal representative of a sequence of at least one video image frame into a bit stream, the method comprising the steps of:

assigning a symbolic code to an object contained in the at least one video frame, wherein the symbolic code identifies a corresponding generic object from a set of generic objects;

computing a difference signal in dependence upon a difference between the object and the corresponding generic object; and multiplexing the difference signal and the symbolic code to form the bit stream.

15. The method of claim 14 further comprising the step of storing an unrecognized object in the set of generic objects.

16. The method of claim 14 wherein the step of assigning includes the step of extracting at least one object from the at least one video image frame.

17. The method of claim 14 wherein the step of assigning includes a step of computing at least one feature quantity for the object.

18. The method of claim 17 further comprising the step of comparing the at least one feature quantity of the object to at least one feature of the generic objects.

19. The method of claim 14 further comprising the steps of:

forming a motion compensation signal based upon the motion of the object from a first frame to a second frame; and multiplexing the motion compensation signal into the bit stream.

20. A system for reconstructing a video image from a bit stream representative of an encoded video signal, the system comprising:

a demultiplexer which extracts a symbolic code and a difference signal from the encoded video signal, wherein the symbolic code identifies a corresponding generic object from a set of generic objects, and wherein the difference signal is representative of a difference between an object and the corresponding generic object; and an object generator, coupled to the demultiplexer, which forms the video image by generating the corresponding generic object identified by the symbolic code, and modifying the corresponding generic object in dependence upon the difference signal.

21. The system of claim 20 wherein the object generator includes a first storage device which contains the set of generic objects.

22. The system of claim 20 wherein the demultiplexer further extracts a motion compensation signal, and wherein the object generator includes a motion compensator which modifies a location of the corresponding generic object in dependence upon the motion compensation signal.

23. A method of reconstructing a video image from a bit stream representative of an encoded video signal, the method comprising the steps of:

extracting a symbolic code from the encoded video signal, wherein the symbolic code identifies a corresponding generic object from a set of generic objects;

extracting a difference signal from the encoded video signal, wherein the difference signal is representative of a difference between an object and the corresponding generic object;

modifying the corresponding generic object in dependence upon the difference signal; and generating the modified corresponding generic object.

24. The method of claim 23 further comprising the steps of:

extracting a motion compensation signal from the encoded video signal; and modifying a location of the corresponding generic object in dependence upon the motion compensation signal.

* * * * *